United States Patent
Fleisch et al.

[15] 3,686,925
[45] Aug. 29, 1972

[54] FLUID AGGLOMERATION TESTING METHODS AND EQUIPMENT

[72] Inventors: Alfred Fleisch, Avenue des Desertes 5, 1009 Pully; Stephan Perren, Davos-Platz, both of Switzerland

[73] Assignee: said Fleisch by said Perren

[22] Filed: Feb. 10, 1970

[21] Appl. No.: 10,221

[30] Foreign Application Priority Data

Feb. 14, 1969 Switzerland...............2245/69

[52] U.S. Cl....................................73/61 R, 73/64.1
[51] Int. Cl.........................G01n 11/02, G01n 33/16
[58] Field of Search...............73/64.1, 61, 53, 61.4; 210/416

[56] References Cited

UNITED STATES PATENTS

| | | |
|---|---|---|
| 3,271,999 | 9/1966 | Dwyer et al. ...................73/61 |
| 3,266,299 | 8/1966 | Swank...........................73/61 |
| 3,371,786 | 3/1968 | Fann............................73/61 X |
| 3,492,396 | 1/1970 | Dalton et al. ............73/64.1 X |
| 3,499,315 | 3/1970 | Marino..........................73/61 |

Primary Examiner—Louis R. Prince
Assistant Examiner—Joseph W. Roskos
Attorney—McGlew and Toren

[57] ABSTRACT

In a method and apparatus for testing fluid, in particular blood, to determine the presence of agglomerations or its tendency to form agglomerations, the fluid is passed through a filter at constant pressure and the rate at which the fluid passes the filter is measured over a given time. The apparatus includes a container having an outlet communicating with the filter and an inlet connected to a flexible-wall chamber, whose flexible wall is subjected to constant pressure by a weight. A lever mechanism connected to the weight controls movement of a stylus on a moving chart, and the lever mechanism is spring biased to compensate for the resistance to deformation of the flexible wall of the chamber.

8 Claims, 1 Drawing Figure

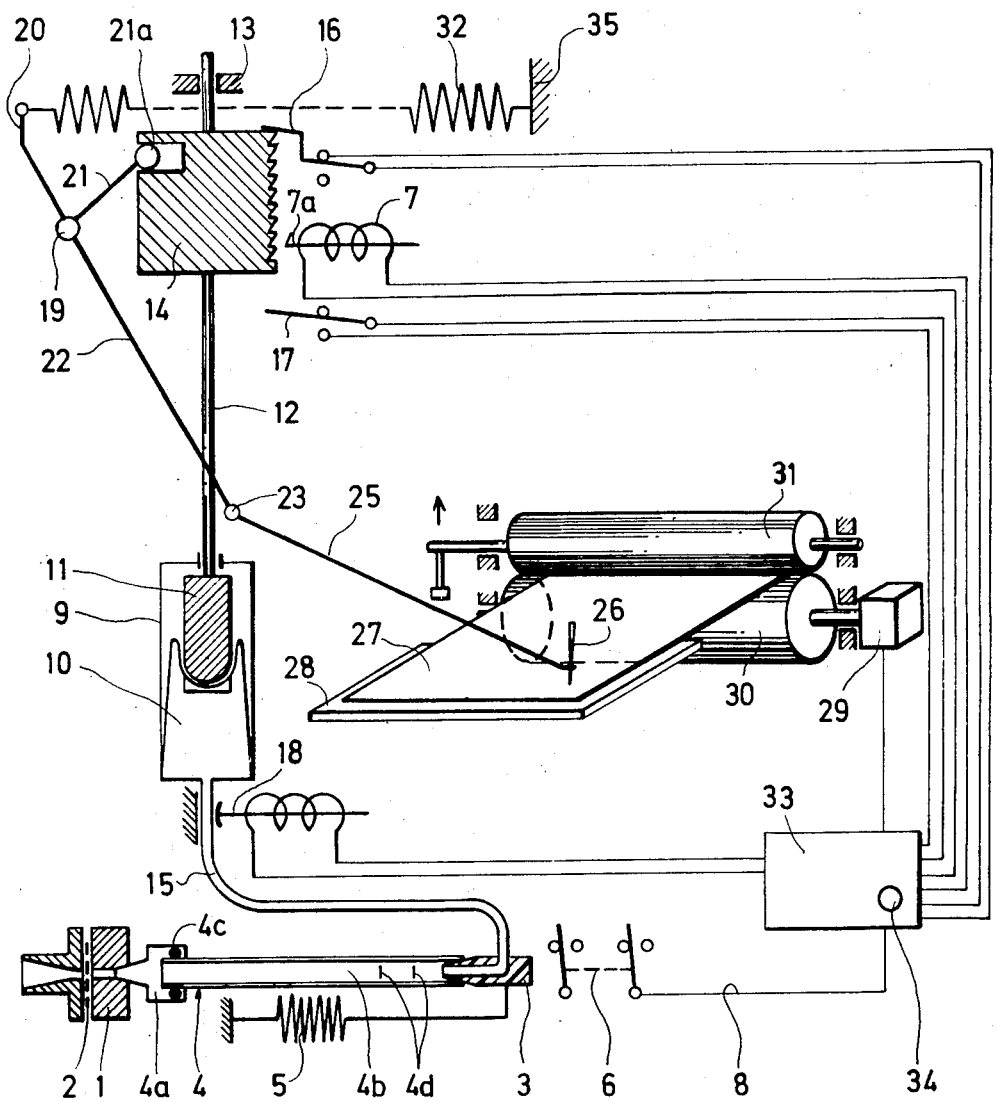

FLUID AGGLOMERATION TESTING METHODS AND EQUIPMENT

BACKGROUND OF THE INVENTION

The invention relates to a method of testing a fluid and in particular blood, to determine quantitatively the presence of agglomerations in the fluid and the tendency of the fluid to form such agglomerations.

It is extremely important, when blood transfusions are made as well as when circulation of blood fails, to determine the extent of agglomeration, that is, the bonding together of the blood platlets. Such agglomeration in blood transfusions and circulation failures can be harmful because the blood capillaries are blocked by the agglomerates.

In one method for quantitatively determining the degree of agglomeration, the blood is fed at a constant speed by means of a motor-driven piston pump through a filter having a pore-width of approximately 20 microns, and the pressure required to do this is amplified electronically and recorded. This method however has a considerable disadvantage in that very expensive and complicated apparatus is required to carry it out.

SUMMARY OF THE INVENTION

The present invention relates to a method of quantitatively measuring the agglomeration tendency of a fluid sample comprising the steps of passing the sample through a filter and measuring the rate of flow through the filter at constant pressure. The rate of flow may, if required, by recorded on a graph, this, contrary to all expectations, having proved to be an extremely simple operation.

The blood sample is preferably fed to the filter at a pressure selected from the range between 40 and 120 mm of mercury, that is a pressure such as normally occurs in the blood circulation system. A pressure of 100 mm of mercury has proved very satisfactory.

In another aspect, the invention provides an apparatus for quantitatively testing the agglomeration tendency of a fluid sample, comprising a container for the sample to be measured, a filtering assembly connected to an outlet from the container, a closed, flexible walled, air-filled chamber connected to an inlet to the container, means for applying an external load to the chamber, and means for indicating the rate of deflation of the chamber.

BRIEF DESCRIPTION OF THE DRAWING

One embodiment of the invention will now be described by reference to the attached drawing, which constitutes a schematic illustration of the most important parts of the apparatus.

Referring to the drawing, a filter 2 is clamped in a replaceable filter-holder 1, mounted immovably in the apparatus. An outlet mouth piece 4a of a container 4 is adapted to accommodate a canule (not shown) for receiving a blood sample and is also shaped so that it can be inserted tightly in an inlet in the filter-holder 1 without the need for taking any special sealing precautions. A small glass tube 4b, which together with the mouthpiece 4a, forms the container 4, is secured in the container by means of an O-ring 4c. The container 4 has a capacity of approximately 2 cm$^3$ and carries two marks 4d, which indicate respectively the upper and lower filling limits. The container 4 is held in position in the filter holder 1 by a closure member 3, which is axially displaceable against the force of a spring 5, adapted to be immobilized in the withdrawn position. Near this closure member there is fitted a reversing switch 6, which assumes one or another position, depending upon the position of the closure member 3. The switch is connected to an electric control device 33 by way of a lead 8, which is shown schematically for simplicity.

Contained in a casing 9 is a closed flexible walled air filled chamber constituted by a thin rubber thimble 10, to which is secured a plunger 11. The plunger 11 is connected to a rod 12, the upper end of which is mounted to slide in a guide 13. Mounted on the rod 12 is the weight 14 for providing the load on the thimble. The thimble is connected to the closure member 3 by a flexible pipe 15, there being provided an electromagnetically actuable pinch clip 18, controlled by the control device 33, whereby the flexible pipe can be closed. Two limit switches 16 and 17, connected by leads to the control device 33, indicate to this device when the weight 14 is located respectively in its top and bottom end positions. One side of the weight 14 is formed with a linear ratchet which engages with a catch 7a formed on the end of the core of a solenoid 7, the solenoid being connected to the control device 33.

Three levers 20, 21 and 22 are mounted on a freely rotating shaft 19. The free end 21a of lever 21 slides in a horizontal slot in the weight 14. A recording arm 25 is linked to the free end of the lever 22 by means of a shaft 23 parallel with the shaft 22. The recording arm 25 also carries at its free end a recording pen 26 the tip of which rests on the chart paper 27. The chart paper 27 lies on a paper carrier 28 and a feed roll 30 which is driven by a motor 29. The paper is held firm by a pressure roller 31, so that when the motor 29 turns the paper is moved at right angles to the direction of movement of the recording pen 26.

If the thimble 10 exhibited the same elasticity at each vertical position of the plunger 11, so that the same force was always required to compress this thimble, the same constant pressure would always be produced in the container 4. Since, however, the thimble 10 offers increasing resistance to the entry of the plunger 11, the free end of the lever 20 is connected to the frame 35 of the apparatus through a spring 32. A balancing effect can be achieved by suitable selection of the spring 32 and of the point at which it is secured to the frame 35, so that the air-pressure in the pipe 15 is independent of the extent to which the thimble 10 is compressed.

The measurement of the agglomeration tendency of a blood sample with the help of the above-described apparatus is extremely simple as will be seen from the following description: In the drawing the apparatus is shown in the position that it is in directly after commencement of the measurement: The weight 14 produces, through the rod 12, the plunger 11 and the thimble 10, an air pressure of constant magnitude in the flexible pipe 15, which drives the blood sample in the container 4 through the filter 2 clamped in the holder 1. As this happens, the weight 14 descends and swings the levers 20, 21 and 22. Lever 22 in turn pulls the recording arm 25 to the left. At the same time the rotating motor 29 moves the chart paper 27, so that the travel of the plunger 14 is recorded on the paper as a function of time. Since the movement of the plunger is proportional to the flow of blood through the filter 2, the steepness of the curve constitutes a measure of the rate of flow and therefore of the tendency towards agglomeration. When the weight 14 actuates the limit-switch 17 or (if this is not possible due to blockage of the filter resulting from pronounced tendency of the blood to agglomerate) after the feed-roller 30 has executed one complete revolution, the solenoid 7 is deenergized and its core 7a is released to hold the weight 14 and thus the levers 20, 21 and 22. At the same time the motor 29 is stopped and the flexible pipe 15 is sealed off by pinch clip 18. The chart paper is then removed from the apparatus so that it can be added to the patient's file. The following actions are required to be taken in preparation for the next measurement:

First, the closure member 3 is moved to the right against the force of the spring 5 and is immobilized in this position. The switch 6, thereby actuated, causes the solenoid 7 to release the weight 14, and the pinch clip 18 opens the flexible pipe 15. The container 4 and the filter-holder 1 are then removed from their seats, not illustrated in the drawing. A fresh filter-holder 1 is then fitted and the lever 22 is swung in the anticlockwise direction, so that the weight 14 is raised again and air drawn into the thimble 10. The limit-switch 16, thereby actuated, causes the cut-off means 18 to close, so that the plunger 11 also remains in the upper position when the lever 22 is released again. The apparatus is then ready for the next measurement: A sterile canule is inserted in the mouthpiece 4a of a fresh container and is then pushed into a distended vein until the container 4 is filled up to the vicinity of the mark 4d. The canule is then removed and the container is pushed into the filter carrier and is retained there by means of the spring-loaded closure member 3. The motor 29 is started up by pressing the starting button 34, and the cut-off means 18 is opened so that automatic recording takes place, this requiring a period of about 12 seconds.

We claim:

1. An apparatus for quantatively testing the agglomeration tendency of a blood sample, comprising a container for the sample to be measured, filter means connected to the outlet of said container, a closed flexible-walled gas-filled chamber connected to said blood sample container inlet, means for applying an external load to the chamber to deflate said chamber and to pressurize the inlet to said blood sample container and to force the blood through the outlet and said filter means, and means for indicating the rate of deflation of said chamber.

2. Apparatus as claimed in claim 1, wherein the means for applying an external load comprises a weight.

3. Apparatus as claimed in claim 1 wherein a spring loaded lever is coupled to said weight to compensate for variations in the air pressure applied to the blood due to variations in the resistance of the walls of the chamber to deformation.

4. Apparatus, as claimed in claim 1, including indicating means connected to said means for applying an external load to the chamber.

5. Apparatus, as claimed in claim 4, wherein said indicating means comprises a stylus and a movable recording chart cooperable with said stylus.

6. Apparatus, as claimed in claim 1, wherein said chamber includes an air-tight sealing membrane mounted for flexible displacement therein, said means for applying an external load to the chamber comprising a piston engageable only with said displaceable sealing membrane.

7. A method of measuring the agglomeration tendency of a blood sample using a filter arranged at the discharge of the blood sample container and using a flexible wall gas filter chamber connected to the blood sample container, comprising subjecting the blood sample container to a constant gas pressure to cause the blood sample to be directed through the filter, measuring the rate of flow through the filter, and applying a force to the flexible wall in order to subject the blood sample to the gas pressure.

8. A method according to claim 7, wherein a weight is employed to pressurize the wall of the container and including recording the movement of the weight for a period of time as a measurement of the rate of flow of the blood sample through the filter.

* * * * *